US007603362B2

(12) United States Patent
Elliott et al.

(10) Patent No.: US 7,603,362 B2
(45) Date of Patent: Oct. 13, 2009

(54) ORDERED LIST MANAGEMENT

(75) Inventors: Geoffrey John Elliott, Seattle, WA (US); Brian J. Guarraci, Redmond, WA (US); Aarthi Natarajan, Bellevue, WA (US); John D. Vert, Seattle, WA (US); Edward H. Wayt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 10/922,788

(22) Filed: Aug. 20, 2004

(65) Prior Publication Data

US 2006/0041577 A1 Feb. 23, 2006

(51) Int. Cl.
*G06F 7/00* (2006.01)
*G06F 17/30* (2006.01)
*G06F 17/00* (2006.01)

(52) U.S. Cl. .............................. 707/100; 707/3; 707/5; 707/6; 707/7; 707/8

(58) Field of Classification Search ..................... 707/7, 707/10, 101, 102
See application file for complete search history.

(56) References Cited

U.S. PATENT DOCUMENTS

| 6,427,147 | B1 * | 7/2002 | Marquis | 707/4 |
| 6,721,723 | B1 * | 4/2004 | Gibson et al. | 707/2 |
| 7,478,100 | B2 * | 1/2009 | Murthy et al. | 707/100 |
| 2002/0059272 | A1 * | 5/2002 | Porter | 707/100 |
| 2002/0062241 | A1 * | 5/2002 | Rubio et al. | 705/10 |
| 2002/0062310 | A1 * | 5/2002 | Marmor et al. | 707/3 |
| 2004/0128198 | A1 * | 7/2004 | Register et al. | 705/14 |
| 2004/0267709 | A1 * | 12/2004 | Ji et al. | 707/3 |
| 2005/0046602 | A1 * | 3/2005 | Hayami | 341/59 |

* cited by examiner

*Primary Examiner*—Tony Mahmoudi
*Assistant Examiner*—Cam Y T. Truong
(74) *Attorney, Agent, or Firm*—Lee & Hayes, PLLC

(57) ABSTRACT

Ordered list management is described. An item's position within an ordered list is represented by a path value. A globally unique identifier (GUID) is appended to the path value to enable simultaneous or near-simultaneous modifications to the ordered list without conflict. Furthermore, an ordered list-specific seed value may be prepended to each item's path value to ensure clustering of ordered list items when two or more ordered lists are merged.

15 Claims, 18 Drawing Sheets

ORDERED LIST MANAGEMENT

TECHNICAL FIELD

This invention relates to ordered list management, and more specifically to techniques for adding and rearranging elements in an ordered list and techniques for merging ordered lists.

BACKGROUND

As technology advances, peer-to-peer communications (e.g., instant messaging) are becoming more popular and a variety of peer-to-peer applications are being developed. A unique feature of peer-to-peer communications is that data is shared among two or more users without the need for a centralized server. This has the ability to provide a data sharing environment in which each participating user has equal control over the data, and no one user or computer system has control over the others. While this type of an environment can be viewed as a positive for supporting social group interactions, it can cause some problems from a data management aspect.

For example, a particular peer-to-peer application may allow two or more users to share a music play list in such a way that each user sees the same play list, and hears the same music based on the shared play list. Furthermore, the play list may be modified by any of the users. Data management problems may arise when, for example, one user modifies the play list at approximately the same time that another user modifies the play list. A common result to such a scenario may be that the second user's modification is applied to the play list while the first user's modification is lost. However, by the nature of peer-to-peer connections, actions of one user should not cause actions of another user to be lost.

Similarly, ordered lists of data may be managed by a server in a client-server architecture. In existing client-server architectures, the server typically locks the ordered list when a client requests to make a change. Any other clients wanting to modify the ordered list must wait until the first change is completed, and the lock is removed. This is an undesirable situation due to the wait times that may be imposed, especially if several clients all have access to modify the same data.

Accordingly, a need exists for a technique for managing ordered lists of data that will support simultaneous data modifications from two or more users.

SUMMARY

Techniques for managing ordered lists are described. Relative positions of items within an ordered list are represented by path values that may be based, at least in part, on a binary tree structure. When a new item is added to an ordered list, a new path value is generated and associated with the new item such that the new path value is greater than a path value associated with the immediately previous item and less than a path value associated with the immediately next item.

Conflicts can typically arise if two or more users attempt to add items to the same position within the ordered list at the same time. To prevent such conflicts, a globally unique identifier (GUID) is appended to the end of each item's path value.

It may be desirable to merge two or more ordered lists such that items from each ordered list being merged are clustered together in the resulting merged list. To enforce clustering, an ordered list-specific seed value is prepended to the beginning of each item's path value. When the ordered list is then merged with another ordered list, the items from the ordered list are clustered together in the resulting merged list.

DETAILED DESCRIPTION

Overview

The embodiments described below provide techniques for managing ordered lists that can support simultaneous or conflicting changes from multiple users. In the described implementation, each item in an ordered list is assigned a unique path that represents the item's position in the list, relative to the positions of the other items in the list. When an item is moved within a list, the unique path associated with the item is modified to reflect the item's new position in the list. In an exemplary implementation, an item's unique path is based on a binary tree algorithm. In an alternate implementation, an item's unique path is based on a combination of a binary tree algorithm and a unique identifier assigned to the item. In another alternate implementation, an item's unique path is also based on a random seed number associated with the ordered list.

Network Environments

Figure 1:
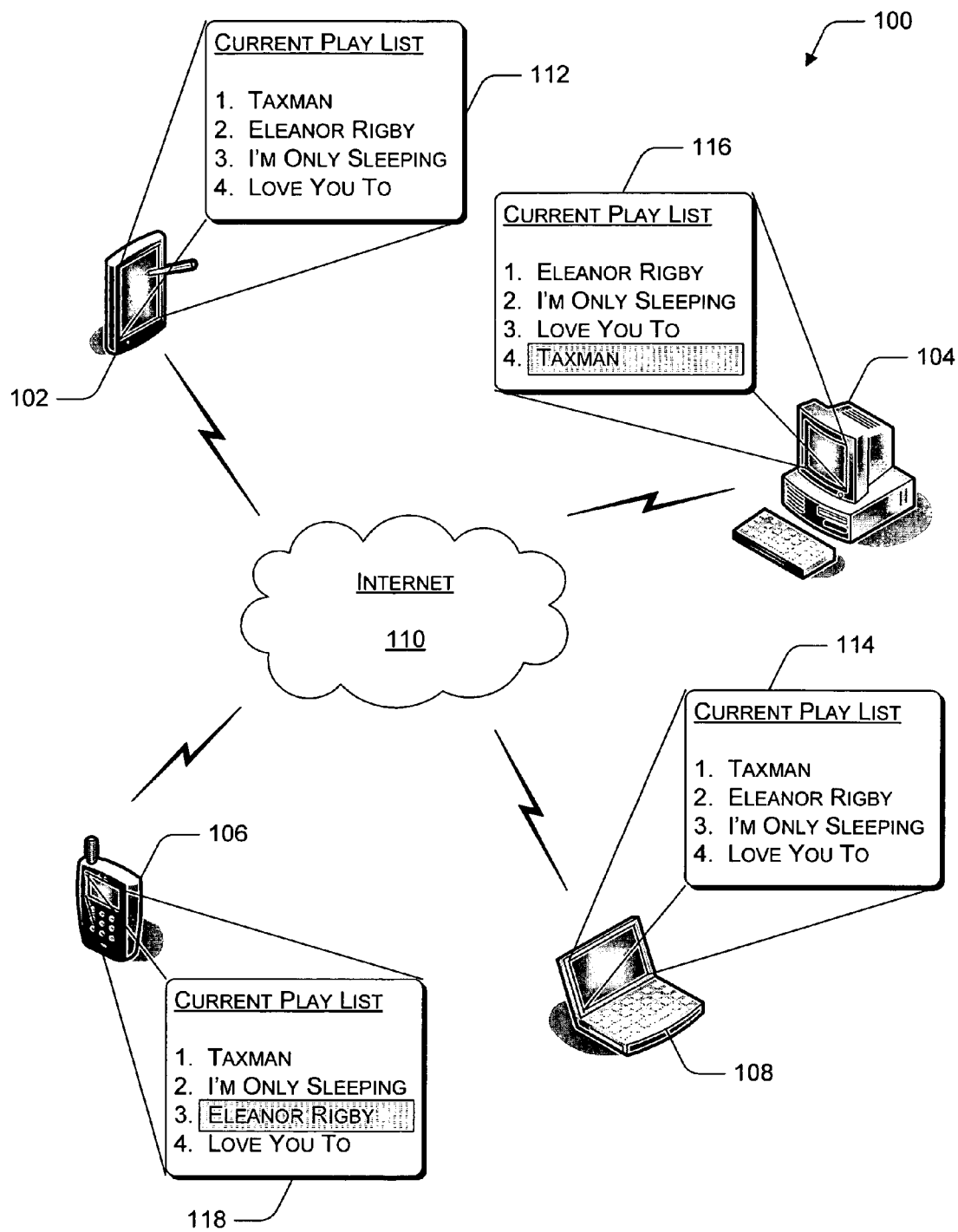
FIG. 1 is a pictorial diagram that illustrates an exemplary environment in which ordered list management may be implemented.

FIG. 1 illustrates an exemplary network environment 100 in which ordered list management may be implemented. The illustrated environment includes multiple client devices 102, 104, 106, and 108. The client devices are configured to communicate with one another via peer-to-peer connections over a network such as the Internet 110.

Illustrated environment 100 includes four client devices, but it is recognized that such an environment may include any number of client devices. Furthermore, any type of client device that may be configured to support peer-to-peer communications may be implemented as part of environment 100. For example, client device 102 is representative of a handheld computing device such as a personal digital assistant (PDA) or a tablet PC. Client device 104 is representative of a desktop computer system. Client device 106 is representative of a cellular telephone configured to provide wireless internet access. Client device 108 is representative of a laptop computer system. Client devices implemented as part of environment 100 may be configured to include wired and/or wireless network interfaces. For example, desktop computer system 104 may be connected to Internet 110 via a wired Ethernet connection, while tablet PC 102 and cellular telephone 106 may be connected to Internet 110 via wireless connections. Laptop computer system 108 may be configured to connect to the Internet 110 via either a wired Ethernet connection or via a wireless connection.

In the illustrated example, client devices 102, 104, 106, and 108 are connected to one another via peer-to-peer connections, and are all participating in a shared music experience. As such, a user interface on each client device displays the same play list of songs that are currently being shared. For example, display 112 is shown on client device 102 and display 114 is shown on client device 108.

Because the play list is being shared via peer-to-peer technology, users of any of the client devices may modify the play list at any time. This is illustrated in FIG. 1 with displays 116 and 118. Display 116 is associated with client device 104 and illustrates a user modifying the play list by moving the first item in the list (i.e., the song, "Taxman") to the fourth position in the list. As a result, each of the other items in the list moves up one position. Similarly, display 118 is associated with client device 106 and illustrates a user modifying the play list by moving the second item in the list (i.e., the song, "Eleanor Rigby") from the second position in the list to the third position in the list. As a result the item that was third in the list moves up to the second position.

Figure 2:
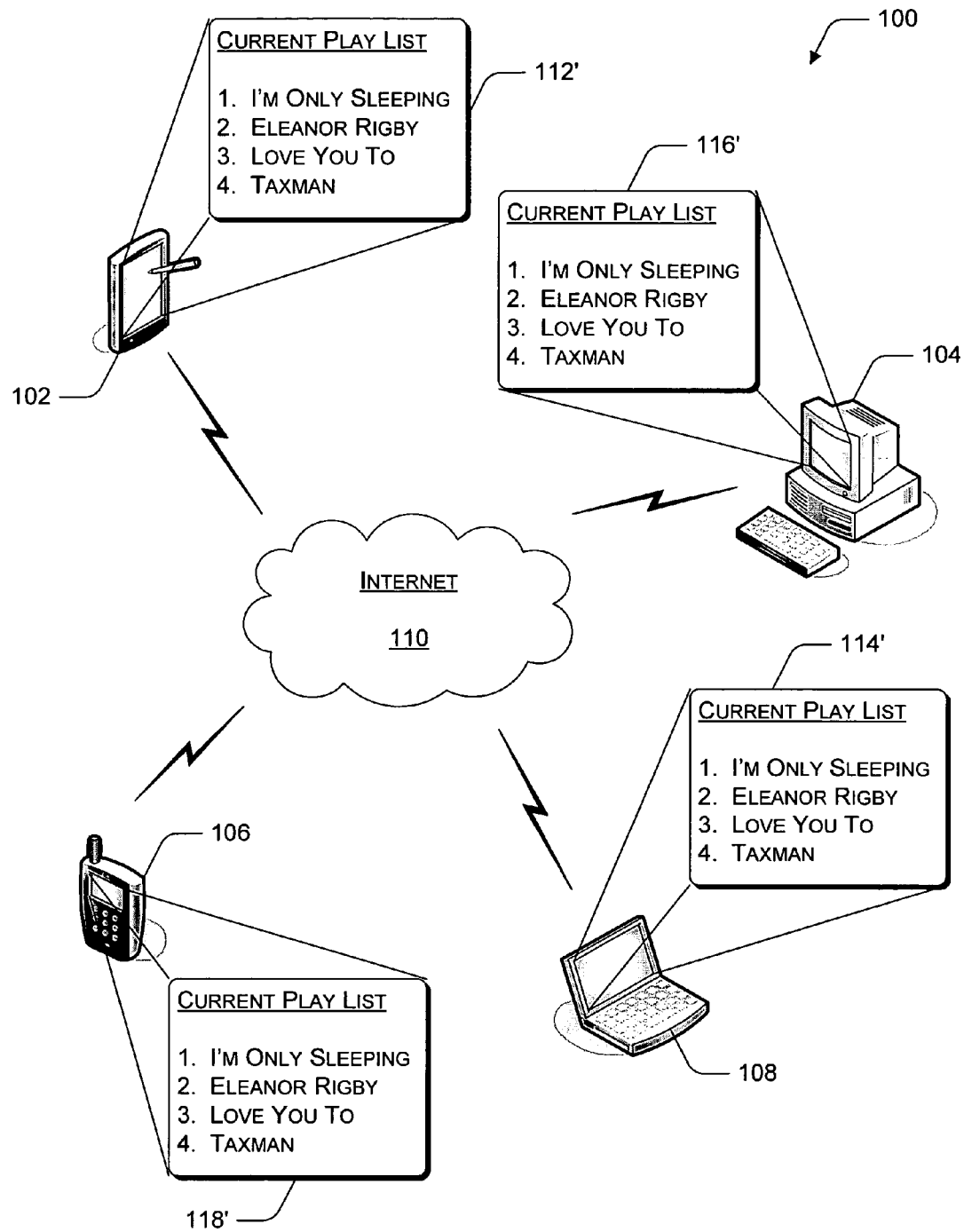
FIG. 2 is a pictorial diagram that illustrates resulting screen displays when two users modify a play list in the environment shown in FIG. 1.

FIG. 2 illustrates the resulting screen displays after the modifications illustrated in FIG. 1 are performed and each display is updated. The resulting displays 112', 114', 116', and 118' are all identical with the changes made from client device 104 and client device 106 both represented. That is, the song, "Eleanor Rigby" is after the song, "I'm Only Sleeping", as modified by a user of client device 106; and the song "Taxman" is after the song, "Love You To", as modified by a user of client device 104.

Figure 3:
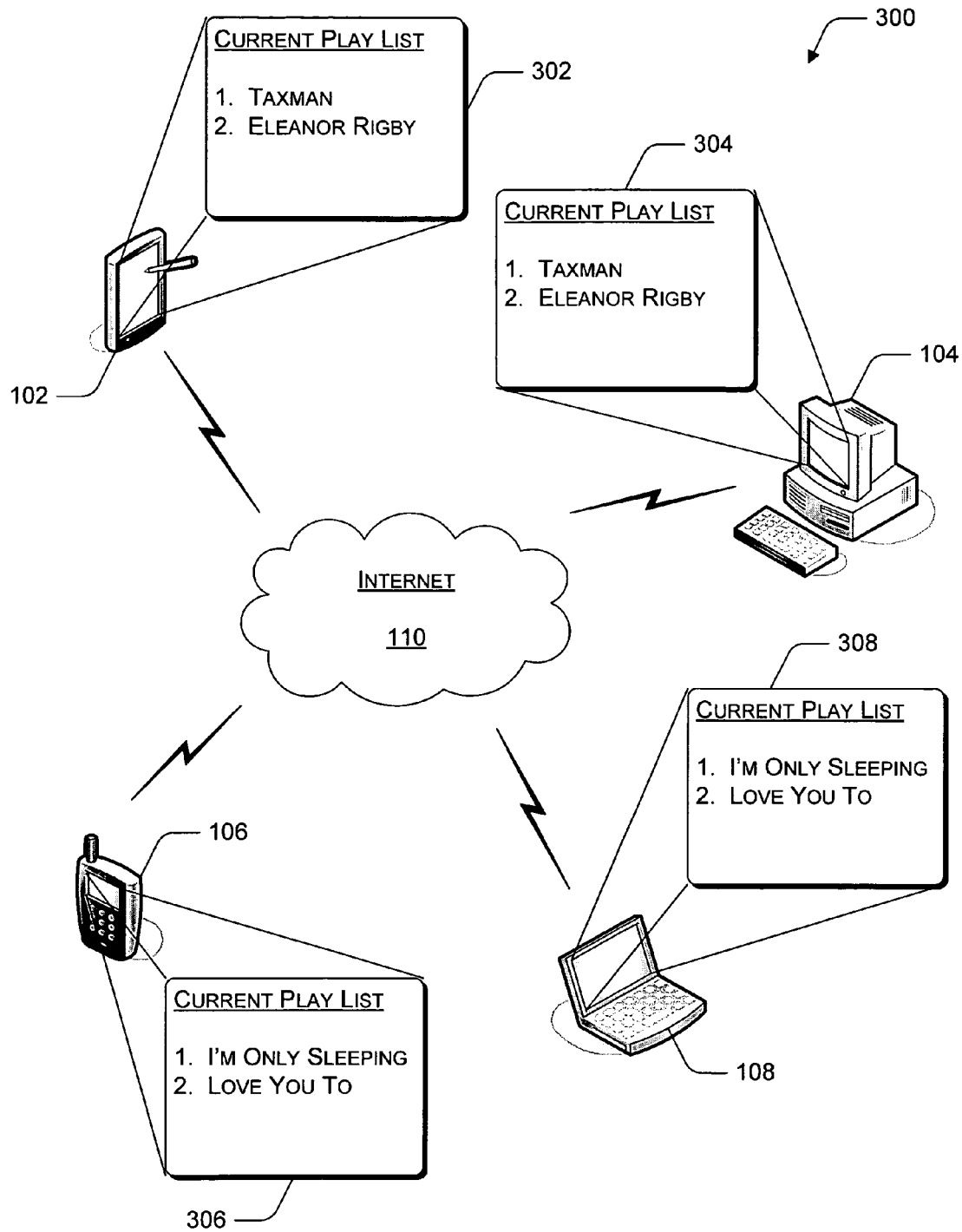
FIG. 3 is a pictorial diagram that illustrates an environment in which two ordered lists exist.
Figure 4:
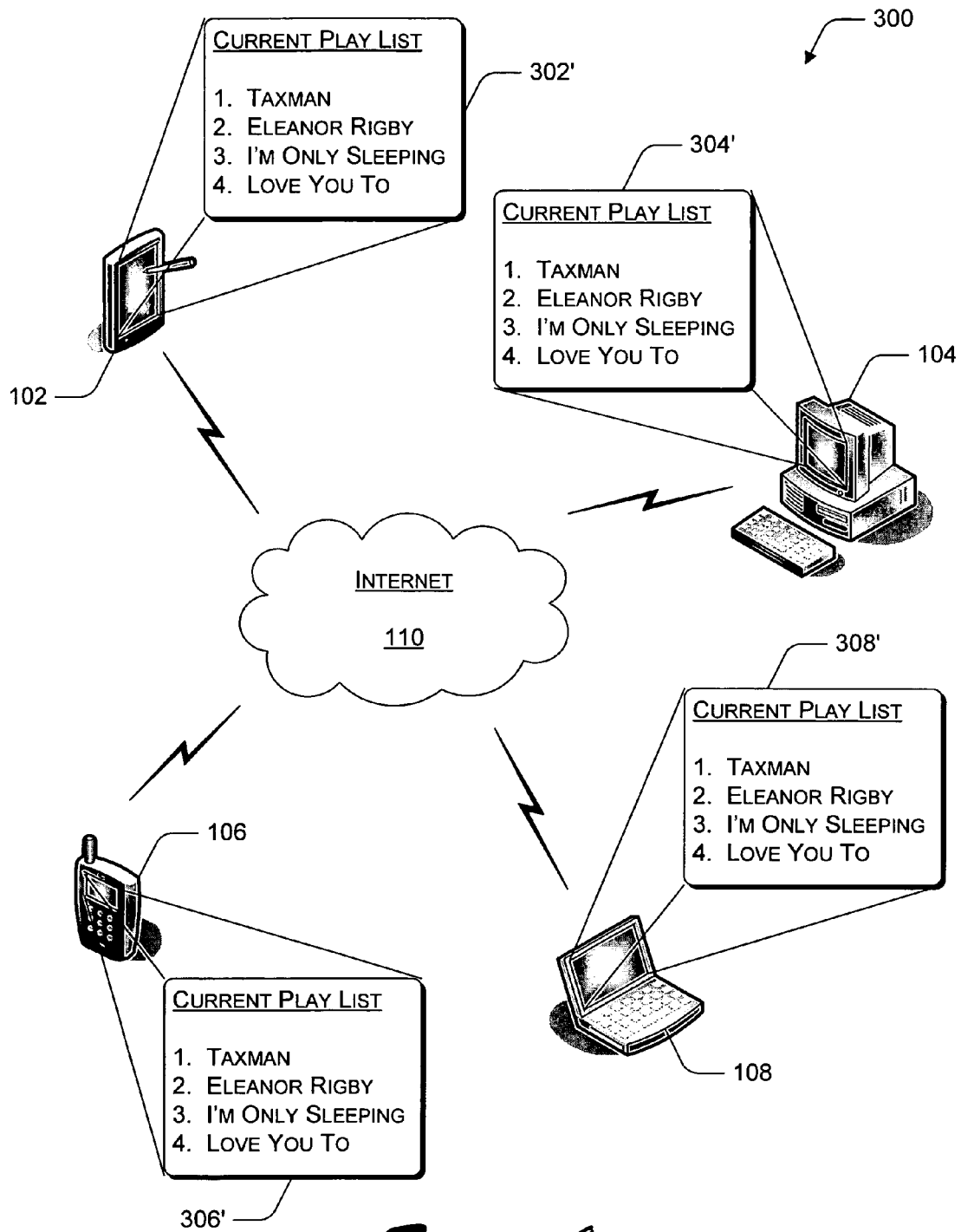
FIG. 4 is a pictorial diagram that illustrates a result of merging the two ordered lists shown in FIG. 3.

The techniques for managing ordered lists described herein also provide predictable results when two or more ordered lists are merged. FIGS. 3 and 4 illustrate an exemplary environment 300 in which two ordered lists are merged.

The techniques for managing ordered lists described herein also provide predictable results when two or more ordered lists are merged. FIGS. 3 and 4 illustrate an exemplary environment 300 in which two ordered lists are merged.

FIG. 3 illustrates an exemplary environment 300 in which two ordered lists have been established. In the illustrated example, users of client devices 102, 104, 106, and 108 belong to a virtual group through which they can establish peer-to-peer connections with one another. In the illustrated example, client devices 102, 104, 106, and 108 all attempt to connect to the group at approximately the same time. Due to network constraints, a peer-to-peer connection is established between client device 102 and 104, and another peer-to-peer connection is established between client device 106 and client device 108. However, at this time, a connection has not yet been established between client device 102 and client device 106 or client device 108, or between client device 104 and client device 106 or client device 108. As such, client device 102 and client device 104 are able to share a play list of songs (shown on displays 302 and 304) while client device 106 and client device 108 are able to share another play list of songs (shown on displays 306 and 308). When peer-to-peer connections are established that connect client devices 102 and 104 with client devices 106 and 108, the two play lists need to be merged.

FIG. 4 illustrates the resulting screen displays after the play lists shown in FIG. 3 are merged. The resulting displays 302', 304', 306', and 308' are all identical, and show a merged play list. Furthermore, the play list is merged in such a way that results in a clustering effect so that each original play list is intact as a subset of the merged play list. That is, the play list that was being shared by client devices 102 and 104 in FIG. 3 is represented by items 1 and 2 in the new play list illustrated in FIG. 4. Similarly, the play list that was being shared by client devices 106 and 108 in FIG. 3 is represented by items 3 and 4 in the new play list illustrated in FIG. 4.

Figure 5:
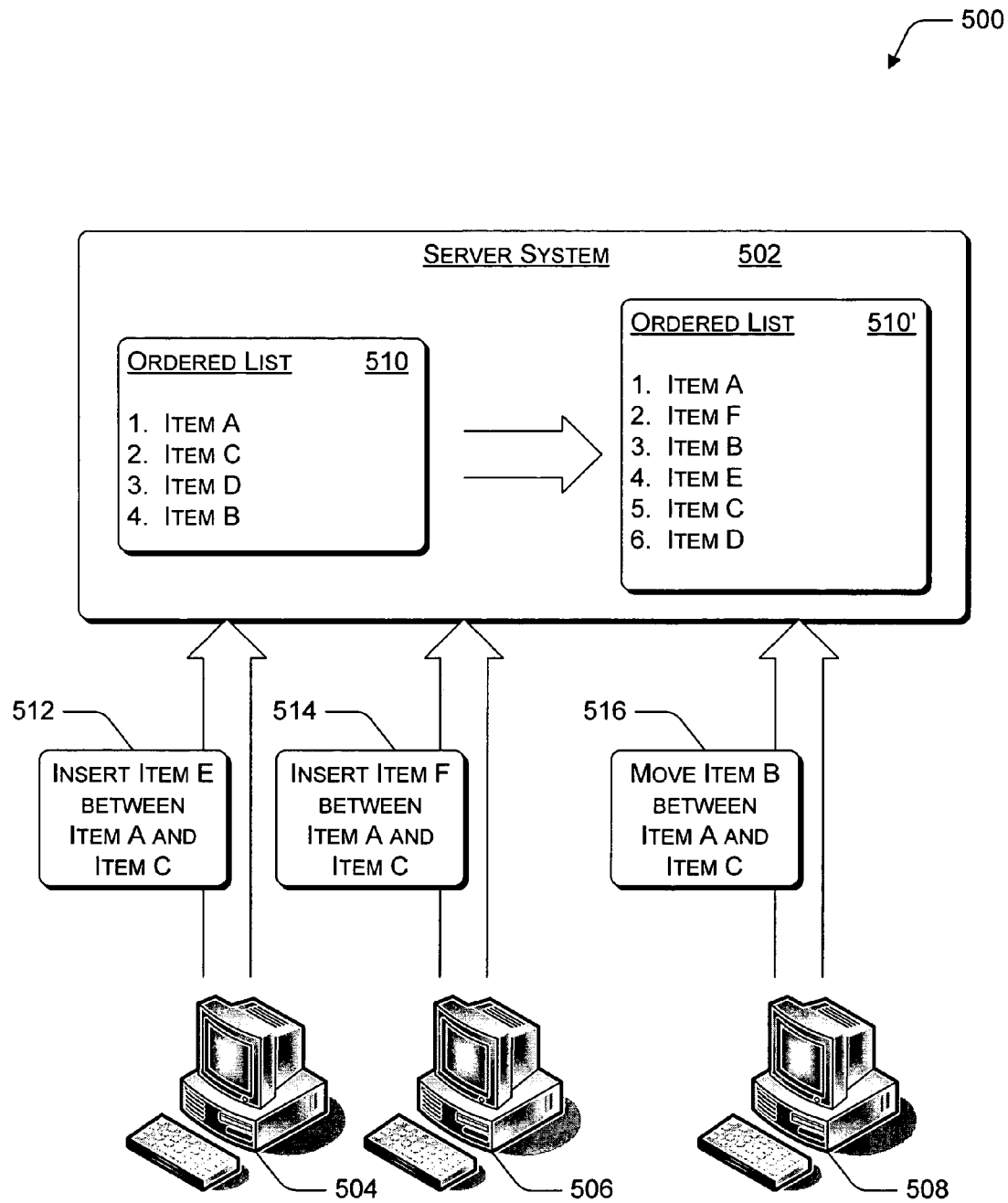
FIG. 5 is a pictorial diagram that illustrates an alternate exemplary implementation in which ordered list management may be implemented.

FIG. 5 illustrates an alternate network environment 500 in which ordered list management may be implemented. The illustrated environment includes server system 502 and multiple client devices 504, 506, and 508. The client devices are configured to communicate with the server system 502 over a network (not specifically shown). Example networks may include, but are not limited to, Ethernet, the Internet, and wireless networks.

Illustrated environment 500 includes three client devices, but it is recognized that such an environment may include any number of client devices. Furthermore, any type of client device that may be configured to support client-server communications may be implemented as part of environment 500. Specific examples of client devices that may be implemented as part of environment 500 include, but are not limited to: desktop computer systems, laptop computer systems, handheld computing devices such as a personal digital assistant (PDA) or a tablet PC, and cellular telephones configured to provide wireless network access.

In the illustrated example, server system 502 maintains data in an ordered list 510. At the same time, or at nearly the same time, client devices 504, 506, and 508 each direct server system 502 to modify the ordered list 510. The modification requests are conflicting in that each requests that a new item or an existing item be placed at the same position within the ordered list. That is, client device 504 submits a request 512 to insert a new item E between existing item A and existing item C; client device 506 submits a request 514 to insert a new item F between existing item A and existing item C; and client device 508 submits a request 516 to move existing item B up the list to a position between existing item A and existing item C.

Ordered list 510' illustrates an ordered list that may result after requests 512, 514, and 516 are processed. Server system 502 modifies ordered list 510 to position new item E, new item F, and existing item B between existing item A and existing item C, without locking the ordered list to process each request.

In another alternate implementation, server system 502 may be implemented as a cluster of multiple server computer systems that communicate with each other, for example, via peer-to-peer connections. In such an implementation, requests from clients may be received by any of the servers in the cluster, and the ordered list that is managed by the cluster is updated accordingly.

Ordered List Management Using a Binary Tree

Figure 6A:
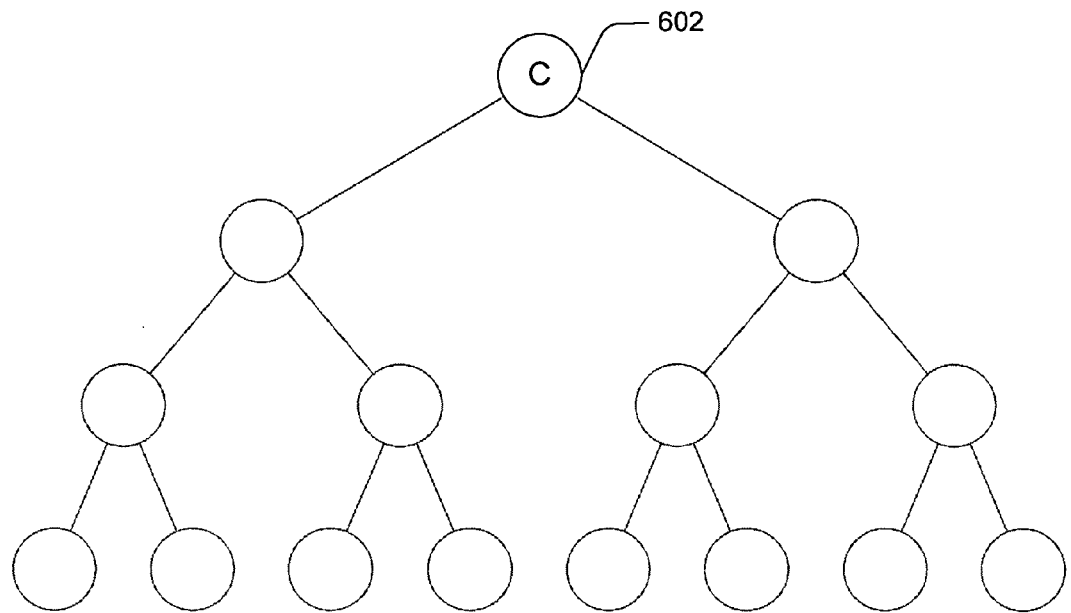
FIG. 6a is a block diagram that illustrates a binary tree structure representation of an ordered list that includes one item.

FIGS. 6a-6f illustrate growth of a binary tree structure that may be used to represent an ordered list of items. The ordered list:

| | |
|---|---|
| 1. | F |
| 2. | C |
| 3. | B |
| 4. | D |
| 5. | A |
| 6. | E | may be generated one step at a time, and represented using the binary tree illustrated in FIGS. 6a-6f. For example, if the ordered list is created by first adding item C, then item C is assigned a position 602 at the top of a binary tree, as illustrated in FIG. 6a. At this point, the ordered list is:

| | |
|---|---|
| 1. | C |

If item A is then added to the list after item C, then the list would look like:

| | |
|---|---|
| 1. | C |
| 2. | A |

Figure 6B:
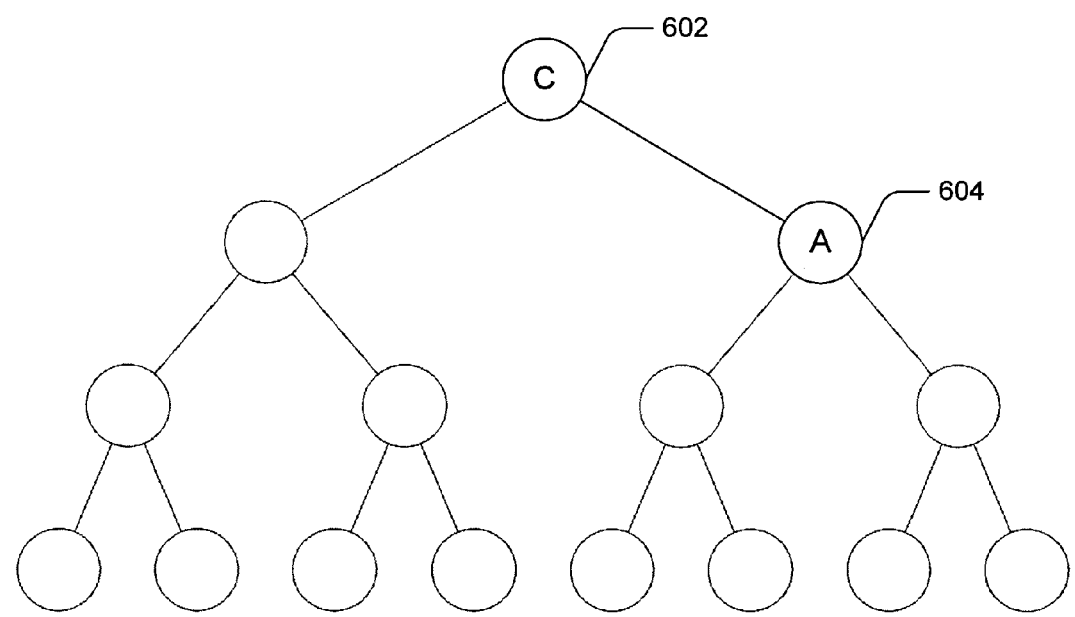
FIG. 6b is a block diagram that illustrates a binary tree structure representation of an ordered list that includes two items.

To add item A to the binary tree representation, a node 604 is added to the right of node 602, as illustrated in FIG. 6b. If item B is then added to the list between items C and A, then the list would look like:

| | |
|---|---|
| 1. | C |
| 2. | B |
| 3. | A |

Figure 6C:
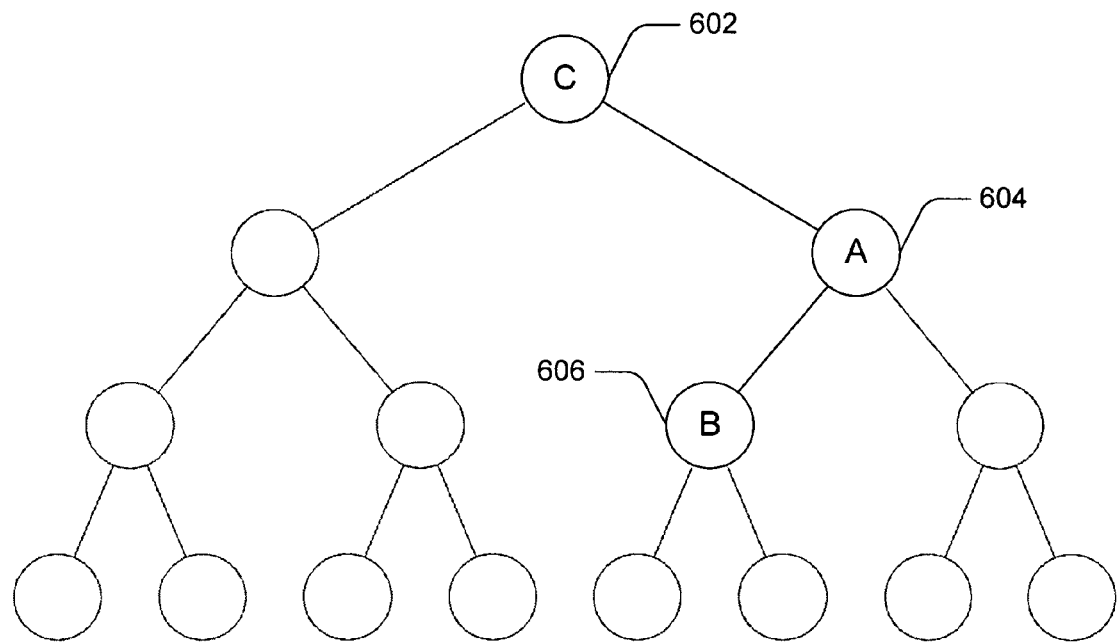
FIG. 6c is a block diagram that illustrates a binary tree structure representation of an ordered list that includes three items.

To add item B to the binary tree representation, a node 606 is added to the left of node 604, as illustrated in FIG. 6c. If item D is then added to the list between items B and A, then the list would look like:

| | |
|---|---|
| 1. | C |
| 2. | B |
| 3. | D |
| 4. | A |

Figure 6D:
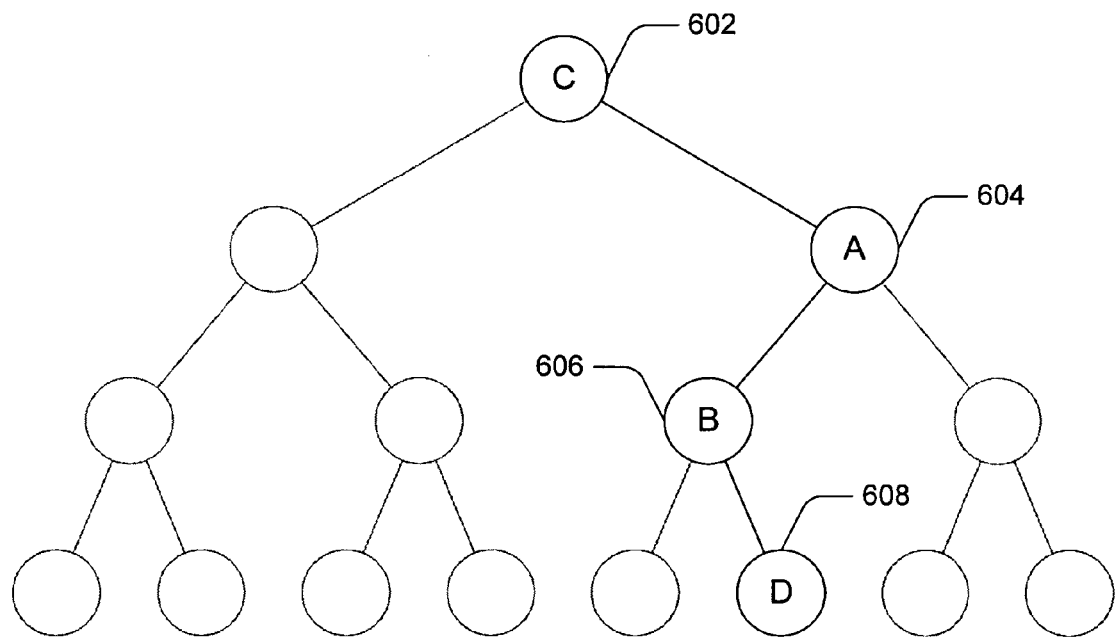
FIG. 6d is a block diagram that illustrates a binary tree structure representation of an ordered list that includes four items.

To add item D to the binary tree representation, a node 608 is added to the right of node 606, as illustrated in FIG. 6d. If item E is then added to the list after item A, then the list would look like:

| | |
|---|---|
| 1. | C |
| 2. | B |
| 3. | D |
| 4. | A |
| 5. | E |

Figure 6E:
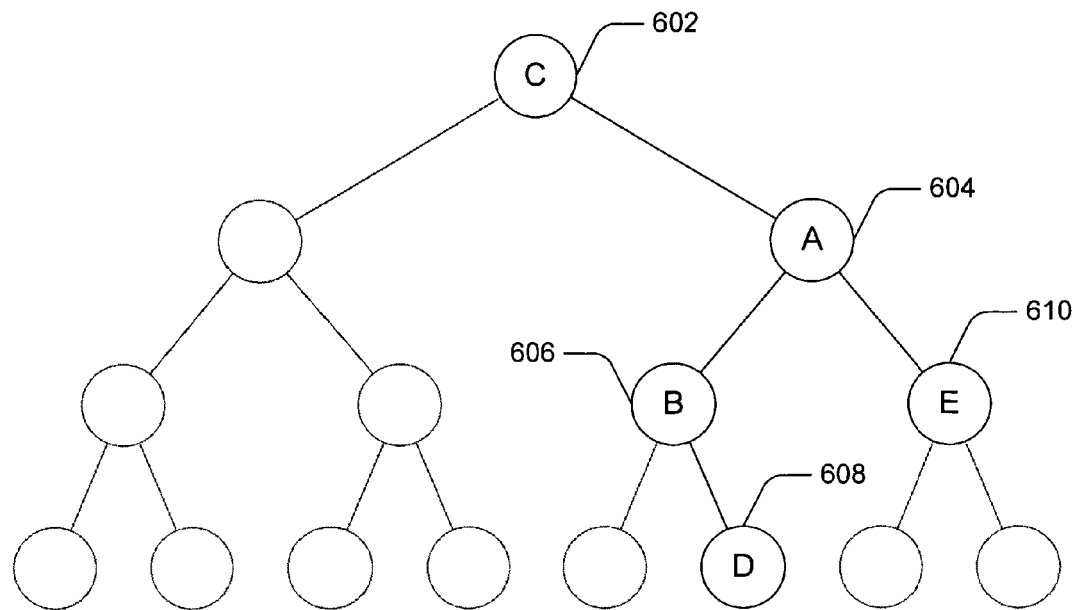
FIG. 6e is a block diagram that illustrates a binary tree structure representation of an ordered list that includes five items.

To add item E to the binary tree representation, a node 610 is added to the right of node 604, as illustrated in FIG. 6e. If item F is then added to the list before item C, then the list would look like:

| | |
|---|---|
| 1. | F |
| 2. | C |
| 3. | B |
| 4. | D |
| 5. | A |
| 6. | E |

Figure 6F:
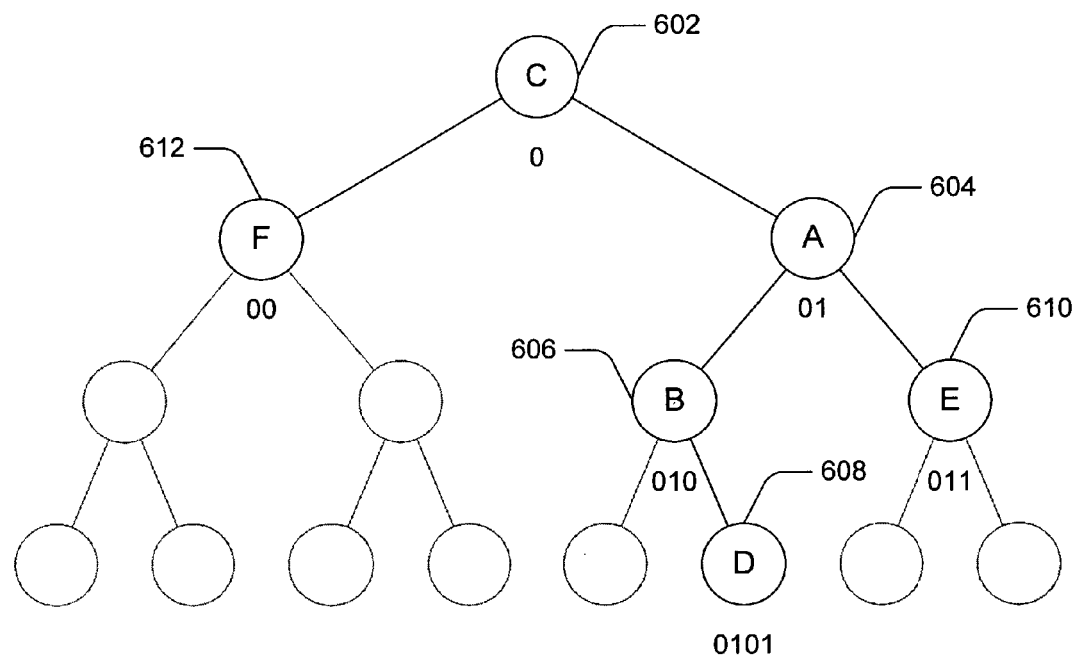
FIG. 6f is a block diagram that illustrates a binary tree structure representation of an ordered list and path values that may be associated with the ordered list items.

To add item F to the binary tree representation, a node 612 is added to the left of node 602, as illustrated in FIG. 6f.

The location of any particular item within the list can be represented by a path through the binary tree representation of the list to the particular item. For example, we assign a path value of 0 to the top-most node of the binary tree (e.g., the first item added to the ordered list). For each additional node, we add onto the path a 0 for each time we move to the left, and a 1 for each time we move to the right. As such, the path for item F is 00 because it is one node to the left from item C. Similarly, item D is assigned a path value of 0101 because we get to item D by starting at the top-most node (value 0), moving one to the right (value 1), moving one to the left (value 0), and then moving one to the right (value 1). Furthermore, based on the structure of a binary tree, given two existing paths, a path to a new node between the two can be created. Therefore, as illustrated in FIGS. 6a-6f, items can easily be added one at a time at any location to an ordered list that is represented as a binary tree.

Figure 7:
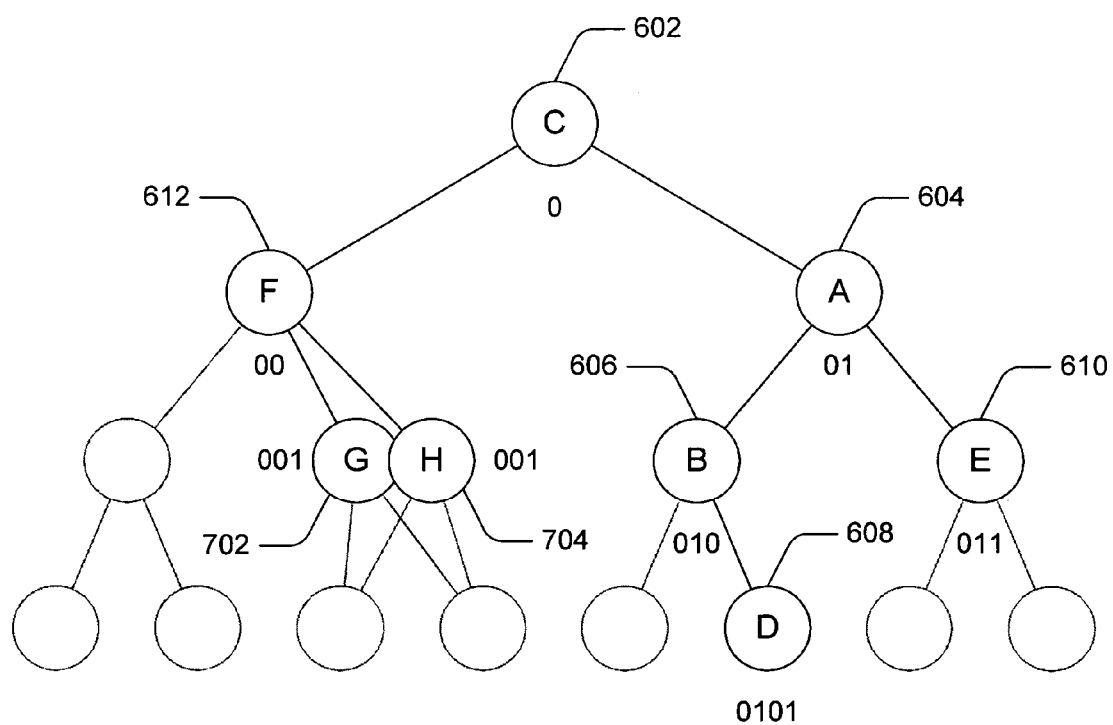
FIG. 7 is a block diagram that illustrates a conflict that may occur in a binary tree structure representation of an ordered list.

FIG. 7 illustrates a conflict that can occur when two users attempt to add different items to the same place in an ordered list. For example, if a first user adds item G between items F and C, the resulting list would look like:

| | |
|---|---|
| 1. | F |
| 2. | G |

-continued

| | |
|---|---|
| 3. | C |
| 4. | B |
| 5. | D |
| 6. | A |
| 7. | E |

This is illustrated in FIG. 7 with the addition of node 702 to the right of node 612. Because of its location, item G is assigned a path value of 001.

Similarly, if a second user simultaneously (or near simultaneously) adds item H between items F and C, the resulting list would look like:

| | |
|---|---|
| 1. | F |
| 2. | H |
| 3. | C |
| 4. | B |
| 5. | D |
| 6. | A |
| 7. | E |

This is illustrated in FIG. 7 with the addition of node 704 to the right of node 612. Because of its location, item H is also assigned a path value of 001.

After both nodes 702 and 704 are added, the resulting binary tree can be used to generate an ordered list:

| | |
|---|---|
| 1. | F |
| 2. | G |
| 3. | H |
| 4. | C |
| 5. | B |
| 6. | D |
| 7. | A |
| 8. | E |
| or possibly: | |
| 1. | F |
| 2. | H |
| 3. | G |
| 4. | C |
| 5. | B |
| 6. | D |
| 7. | A |
| 8. | E |

(with the order of items G and H reversed). The conflict becomes apparent when a user attempts to insert a new item between items G and H. Because items G and H both have the same location in the binary tree, and thus the same path value, there is no path value that can be defined to be between the path values of items G and H.

Ordered List Management Using Modified Binary Tree Paths

Figure 8:
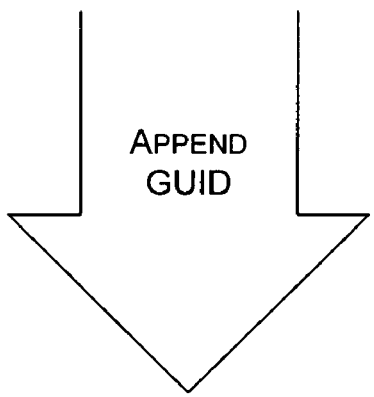
FIG. 8 is a block diagram that illustrates a technique for modifying binary tree structure-based path values that may be associated with items of an ordered list to minimize conflicts.

To avoid conflicts of the type illustrated and described above with reference to FIG. 7, the path value for each item in an ordered list can be modified to ensure that each item has a unique path. In the described exemplary implementation, this is accomplished by appending a globally unique identifier (GUID) to the end of each item's path value. This is illustrated in FIG. 8 where the numbers shown in bold, italic font are the GUIDs that are appended to the end of each item's path value. Because the first portion of the path remains the same, the order of the items in this remains the same. The only exception is that the two items that had the same binary tree path (items G and H) may be re-ordered, based on the difference between the GUIDs that are added to the path values for those items. In the illustrated example, after appending the GUID, the path value for item H is 001101 and the path value for item G is 0011101. To determine which item comes first in the list, the path values are compared, beginning at the left. The first four digits are the same (i.e., 0011). The fifth digits differ, with item H having a 0 and item G having a 1. Accordingly, item H is placed before item G in the ordered list.

Merging Ordered Lists Using Modified Binary Tree Paths

Figure 9:
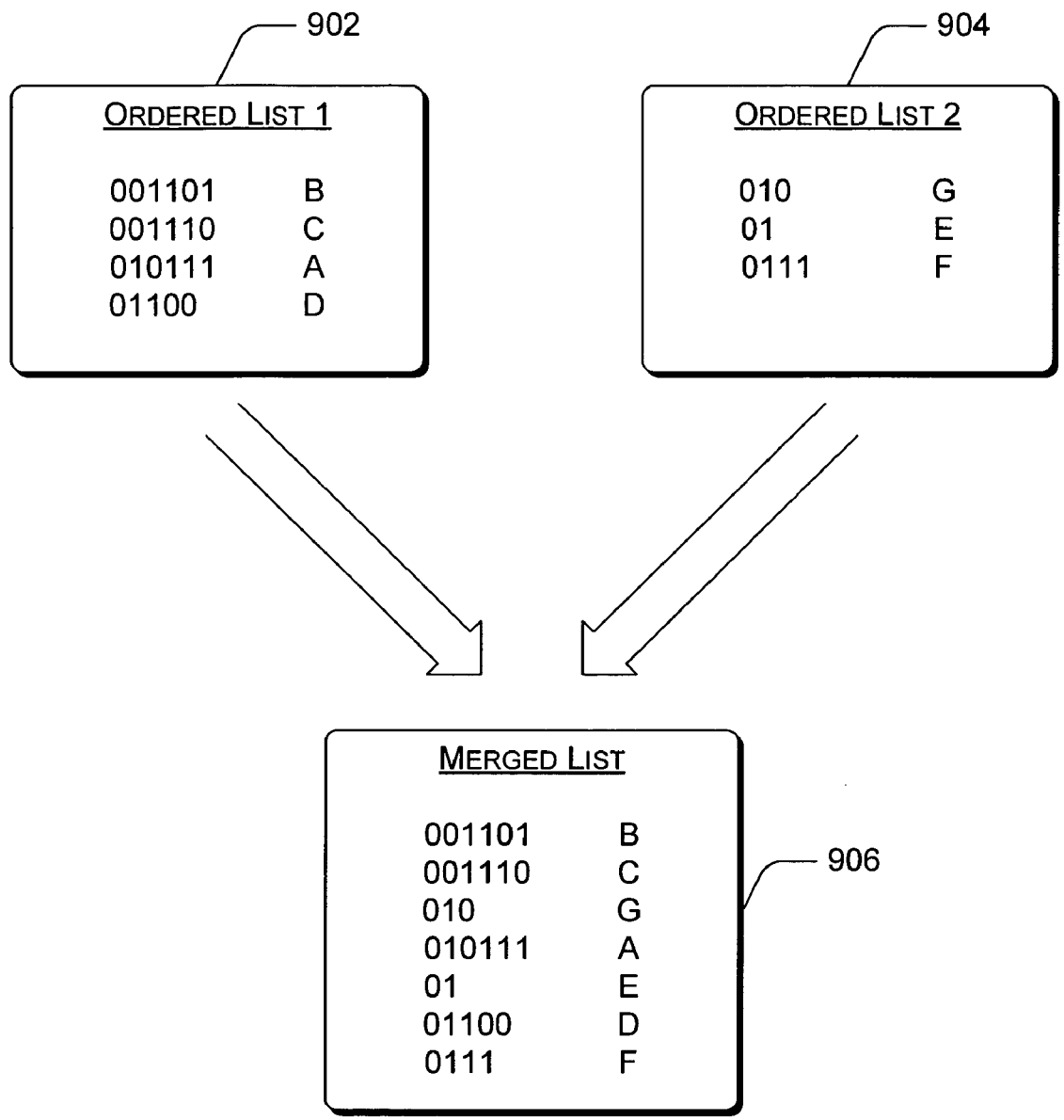
FIG. 9 is a block diagram that illustrates an undesirable result when merging two ordered lists.

As described above with reference to FIGS. 3 and 4, scenarios may exist in which two or more ordered lists are merged. FIG. 9 illustrates a merge of two ordered lists using path values that are generated as described above with reference to FIG. 8. In the illustrated example, ordered list 1, shown in box 902 includes items B, C, A, and D. The order of the items is determined by the path values associated with each item, as shown. Similarly, ordered list 2, shown in box 904 includes items G, E, and F, the order of which is determined by the path values associated with those items, as shown.

When the ordered lists are merged, the result is merged list 906. The order of the items in the merged list is determined, again, by the path values associated with the list items. In the illustrated example, the order of merged list 906 is similar to what would be expected if shuffling the two original lists together like a deck of cards.

While the resulting merged list 906 may be an acceptable result, there remains a slight chance that two items may have the same path value (one item from each original ordered list), resulting in a conflict similar to that described above with reference to FIG. 7. Furthermore, it may be desirable for the items from each original ordered list to be grouped together in the resulting merged list.

Figure 10:
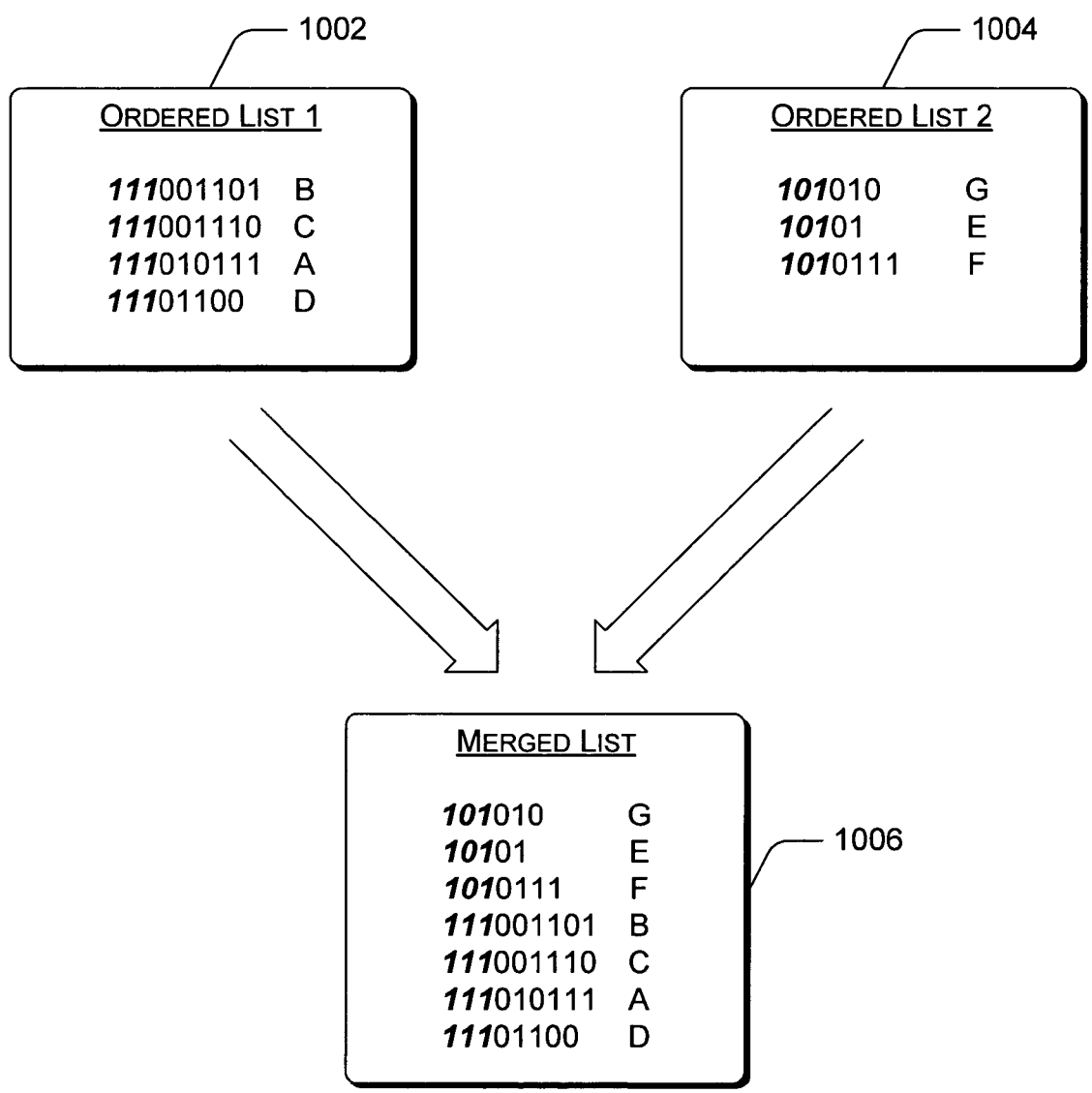
FIG. 10 is a block diagram that illustrates a technique for modifying binary tree structure-based path values to minimize undesirable results when merging two or more ordered lists.

FIG. 10 illustrates a technique for generating item path values that result in clustered merged lists. In the illustrated example, ordered lists 1002 and 1004 are being merged. Ordered lists 1002 and 1004 contain the same items as ordered lists 902 and 904 in FIG. 9, respectively. As ordered lists 1002 and 1004 are created, rather than assigning a path value of 0+GUID to the first item added, a random seed number+0+GUID is used. For example, for ordered list 1002, a random seed number of 111 is prepended. Similarly, for ordered list 1004, a random seed number of 101 is prepended. As a result, merged list 1006 is ordered according to the item path values, with the items from each original list 1002 and 1004 clustered together.

Exemplary Client Device

Figure 11:
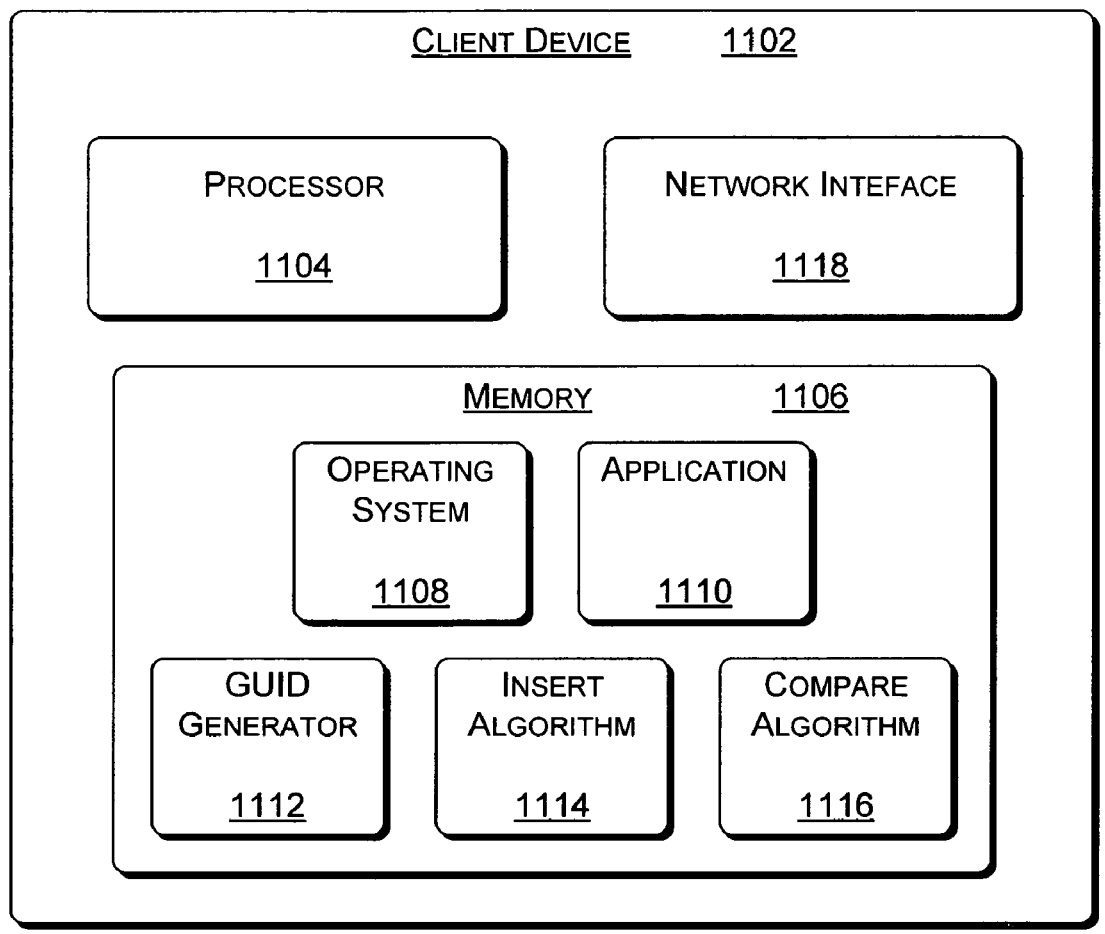
FIG. 11 is a block diagram that illustrates select components of an exemplary client device configured to manage ordered lists.

FIG. 11 illustrates select components of an exemplary client device 1102 configured to manage ordered lists as described herein. Client device 1102 includes a processor 1104 and a memory 1106. An operating system 1108 and an application 1110 are stored in memory 1106 and executed on processor 1104.

A globally unique identifier (GUID) generator 1112 is also stored in memory 1106 and executed on processor 1104. Depending on the implementation, GUID generator 1112 may be a separate component (as illustrated in FIG. 11) or may be a component of either operating system 1108 or application 1110. Insert algorithm 1114 and compare algorithm 1116 are also stored in memory 1106 and executed on processor 1104. Algorithms 1114 and 1116 may also be implemented as separate components (as illustrated in FIG. 11) or may be components of either operating system 1108 or application 1110. Client device 1102 may also include other components such as network interface 1118, for example, to enable communication between client device 1102 and other computer systems.

In the illustrated example, application 1110 provides an interface that enables user manipulation of an ordered list. One example application may be a peer-to-peer application for sharing music with other uses. Other types of applications may also be implemented as described herein, such as an application to enable lockless list management in a multi-threaded environment in which multiple client devices may be simultaneously accessing and modifying data on a server.

GUID generator 1112 is configured to, upon request, generate a unique identifier. GUID generation can be performed in any number of ways, and is well-known to those skilled in the art.

Insert algorithm 1114 is configured to generate, upon request, a path value (as described above with reference to FIG. 10) that is between two existing path values. For example, referring to FIG. 10, if an item were to be added to merged list 1006 between items B and C, then the path values for items B and C (111001101 and 111001110, respectively) would be passed into insert algorithm 1114. A path value between the two, (e.g., 1110011011) would be generated. In an exemplary implementation, a null input is also allowed to enable the addition of items at the beginning or end of an ordered list. For example, to add an item to the end of an ordered list, an input pair of (11101, null) may be passed to insert algorithm 1114, where 11101 is the path value associated with the last item in the list. A path value after 11101 would then be returned. Similarly, to add an item to the beginning of an ordered list, an input pair of (null, 11101) may be passed to insert algorithm 1114, where 11101 is the path value associated with the first item in the list. A path value before 11101 would then be returned.

Compare algorithm 1116 is configured to order two items based on the item path values. For example, compare algorithm 1116 may receive as input two path values associated with items to be listed in an ordered list. Compare algorithm 1116 returns the path value associated with the item that comes first in the ordered list. In an exemplary implementation, the order of the items is determined by comparing the digits of a binary path from left to right and applying a rule that states that "0<null<1". For example, given path values 11101 and 1110, the item with the path of 1110 would be listed in the ordered list before the item with the path of 11101. Similarly, given path values of 11100 and 1110, the item with the path of 11100 would be listed in the ordered list before the item with the path of 1110.

Creating an Ordered List

Figure 12:
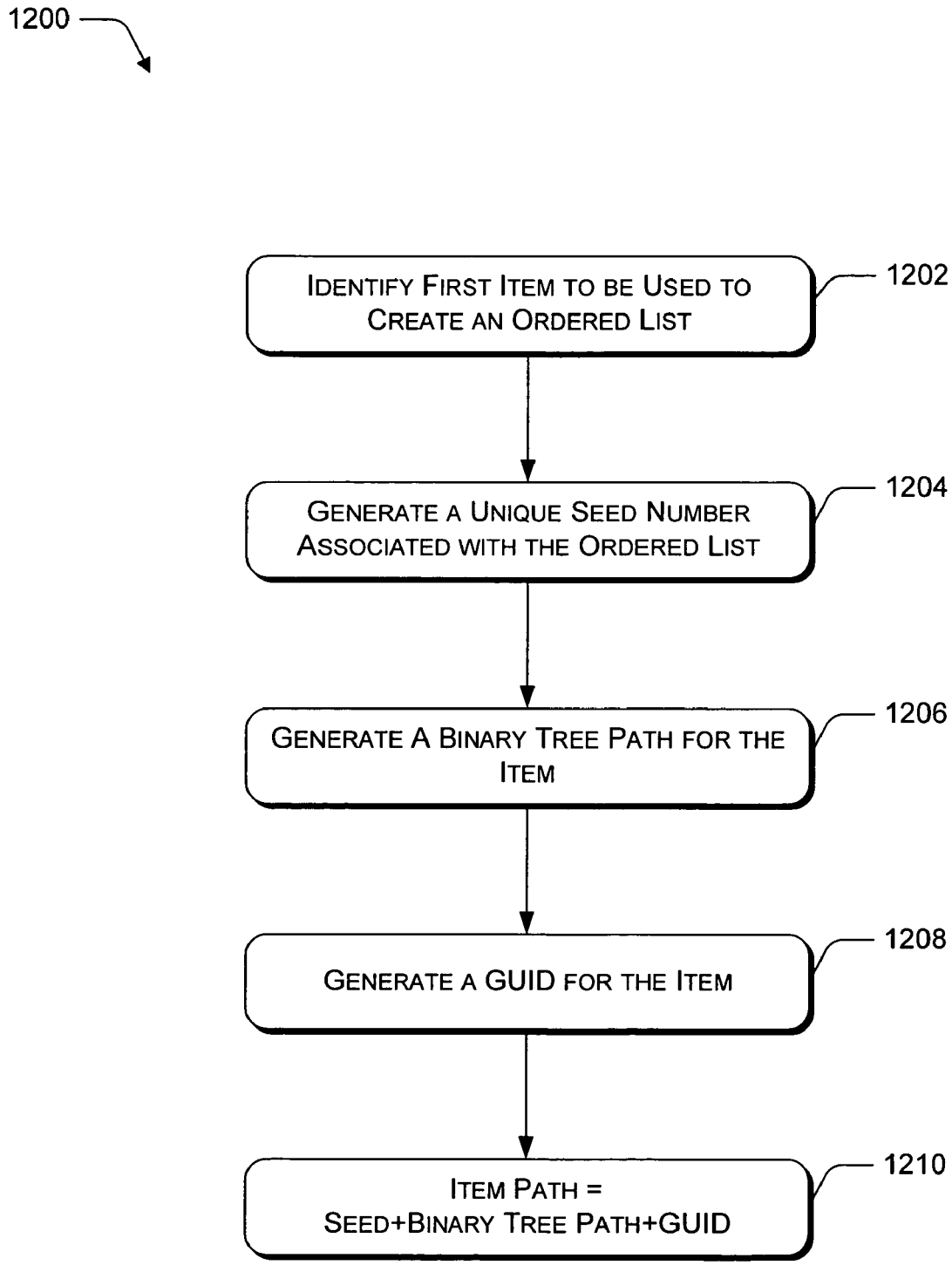
FIG. 12 is a flow diagram that illustrates an exemplary method for creating an ordered list with a first item.

FIG. 12 is a flow diagram that illustrates an exemplary method 1200 for generating a path value to be associated with a first item in an ordered list. The illustrated process can be implemented in any suitable hardware, software, firmware or combination thereof At block 1202, a first item to be used to create an ordered list is identified. For example, referring to FIG. 11, an item may be submitted to application 1110 through a user interface.

At block 1204, a unique seed number is generated for the ordered list that is being created. For example, GUID generator 1112 may be called to obtain a unique seed number.

At block 1206, a binary tree path value is generated for the item. In the described exemplary implementation, because the item being added is the only item in the list, a binary tree path value of 0 is used. This corresponds to a path value that may be assigned to a first element added to a binary tree.

At block 1208, a GUID is generated for the item. For example, GUID generator 1112 is called to obtain another unique number.

At block 1210, an item path value is determined and assigned to the item. In the described exemplary implementation, the path value is generated by concatenating the seed number (described above with reference to block 1204), the binary tree path (described above with reference to block 1206), and the GUID (described above with reference to block 1208). The resulting path value has the format: Seed+Binary Tree Path+GUID. The item path value is then maintained in association with the item value, for example, in a portion of memory 1106 that is managed by application 1110.

Adding an Item to an Ordered List

Figure 13:
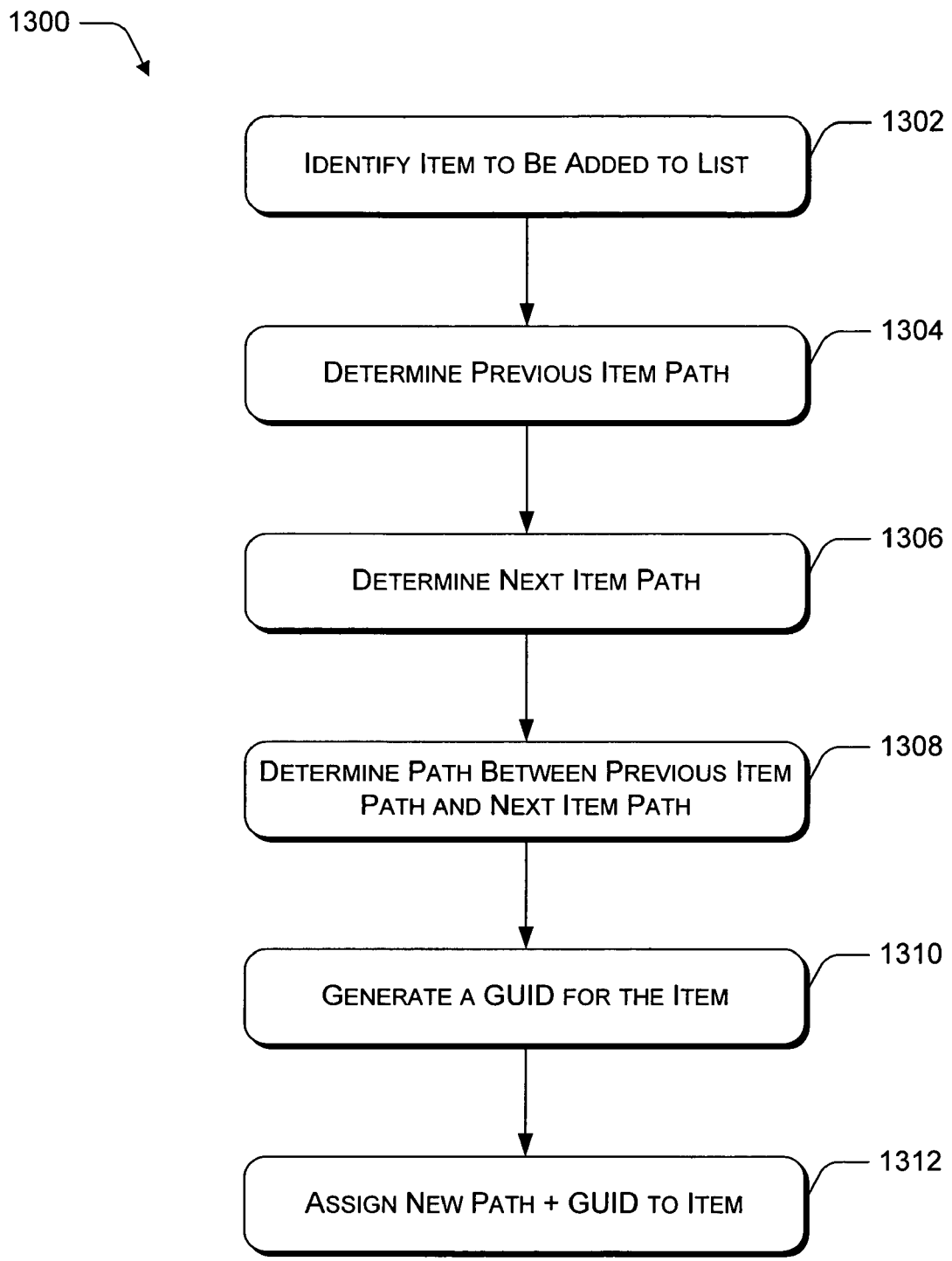
FIG. 13 is a flow diagram that illustrates an exemplary method for adding an item to an ordered list.

FIG. 13 is a flow diagram that illustrates an exemplary method 1300 for adding an item to an ordered list. The illustrated process can be implemented in any suitable hardware, software, firmware or combination thereof.

At block 1302, an item to be added to the ordered list is identified. For example, referring to FIG. 11, an item may be added to the list via a user interface associated with application 1110.

At block 1304, a path value associated with the previous item in the list is determined. For example, based on the location in the ordered list in which the new item is placed, application 1110 identifies the previous item, and determines, based on data stored in memory 1106, a path value associated with that item. If the new item is added to the beginning of the list, a null value is determined as the previous item path value.

At block 1306, a path value associated with the next item in the list is determined. For example, based on the location in the ordered list in which the new item is placed, application 1110 identifies the next item, and determines, based on data stored in memory 1106, a path value associated with that item. If the new item is added to the end of the list, a null value is determined as the next item path value.

At block 1308, the system determines a path value that lies between the previous and next path values determined as described above with reference to blocks 1304 and 1306. For example, application 1110 calls insert algorithm 1114, passing in the path values associated with the next and previous items in the ordered list. An exemplary method for determining a path value that lies between the previous path and the next path values is illustrated and described below with reference to FIG. 14.

At block 1310, the system generates a GUID to be associated with the item. For example, application 1110 calls GUID generator 1112 to get a unique value.

At block 1312, the system assigns a new path value to the item where the path value is a concatenation of the path value determined as described above with reference to block 1308 and the GUID that was generated as described above with reference to block 1310.

Determining a Path Value for an Item being Added to an Ordered List

Figure 14:
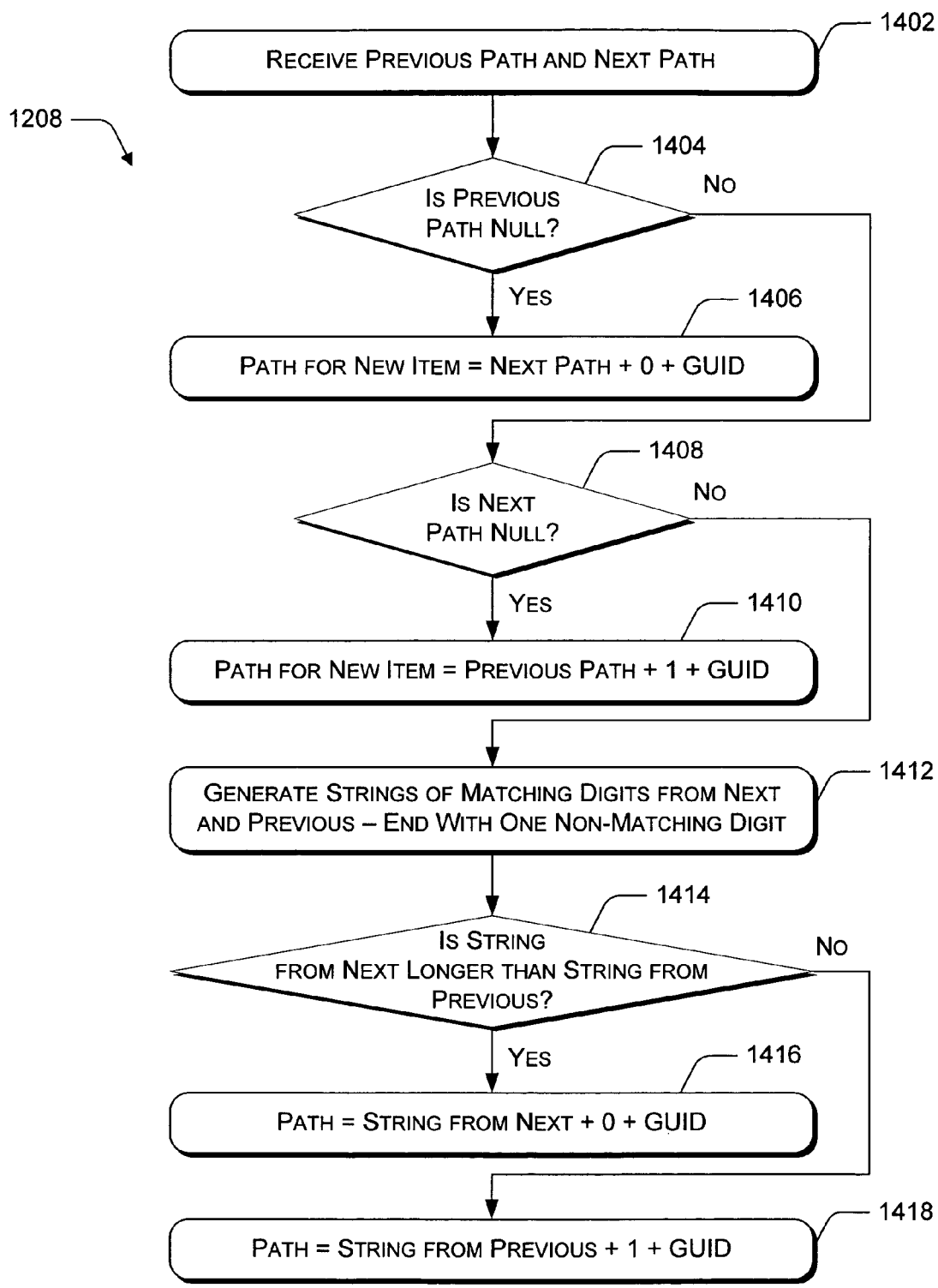
FIG. 14 is a flow diagram that illustrates an exemplary method for determining a path value to be associated with an item that is added to an ordered list.

FIG. 14 is a flow diagram that illustrates an exemplary method 1308 for generating a path value for an item to be added to an ordered list. The illustrated process can be implemented in any suitable hardware, software, firmware or combination thereof.

At block 1402, an insert algorithm receives path values associated with items immediately preceding and immediately following an item that is being added to an ordered list. For example, referring to FIG. 11, insert algorithm 1114 is called with a previous path value and a next path value. If the previous path value is null, it is an indication that the new item is being added to the beginning of the ordered list. Similarly, if the next path value is null, it is an indication that the new item is being added to the end of the ordered list.

At block 1404, the insert algorithm determines whether or not the received previous path value is null.

At block 1406, when it is determined that the received previous path value is null (the "Yes" branch from block 1404), a path value is generated by appending a 0 and a GUID to the end of the next path value. Because the previous value is null, the new item is being added at the beginning of the list and the next path value is associated with the item that was previously first in the ordered list. By appending a 0 to the end of the next path value, the new path will come before the next path value when the items are ordered (based on the rule: 0<null<1). A GUID is added (e.g., generated by GUID generator 1112) to help ensure that the new item is assigned a unique path value, even if another item is added to the ordered list at the same time.

At block 1408, when it is determined that the received previous path value is not null (the "No" branch from block 1404), the insert algorithm determines whether or not the received next path value is null.

At block 1410, when it is determined that the received next path value is null (the "Yes" branch from block 1408), a path value is generated by appending a 1 and a GUID to the end of the previous path value. Because the next path value is null, the new item is being added at the end of the list and the previous path value is associated with the item that was previously last in the ordered list. By appending a 1 to the end of the next path value, the new path will come after the previous path value when the items are ordered (based on the rule: 0<null<1). A GUID is added (e.g., generated by GUID generator 1112) to help ensure that the new item is assigned a unique path value, even if another item is added to the ordered list at the same time.

At block 1412, when it is determined that the received next path value is not null (the "No" branch from block 1408), the insert algorithm compares one digit from the previous path value with one digit from the next path value, beginning with the left-most digits in each value. If the numbers are the same, the matching digits are appended to values (e.g., variables) that represent the matching portions of the received previous and next path values. The digit comparison and appending continues until non-matching digits are found. Because the path values are binary and the rule 0<null<1 applies, a non-matching digit pair of the format ({digit from previous path value}, {digit from next path value}) may be (null, 1), (0, null), or (0, 1). The non-matching digits are also appended to the values that represent the matching portions of the received previous and next path values.

At block 1414, the insert algorithm determines whether the value generated from the next path value is longer (i.e., has more digits) than the value generated from the previous path value. That is, the insert algorithm determines if the non-matching digit pair identified as described above with reference to block 1412 is (null, 1).

At block 1416, when it is determined that the value generated from the next path value is longer than the value generated from the previous path value (the "Yes" branch from block 1414), a path value is generated by appending a 0 and a GUID to the end of the value generated from the next path value.

At block 1418, when it is determined that the value generated from the next path value is not longer than the value generated from the previous path value (the "No" branch from block 1414), a path value is generated by appending a 1 and a GUID to the end of the value generated from the previous path value.

At block 1420, after a path value has been generated (as described above with reference to blocks 1406, 1410, 1416, and 1418), the insert algorithm returns the generated path value.

Determining the Order of Items in an Ordered List

Figure 15:
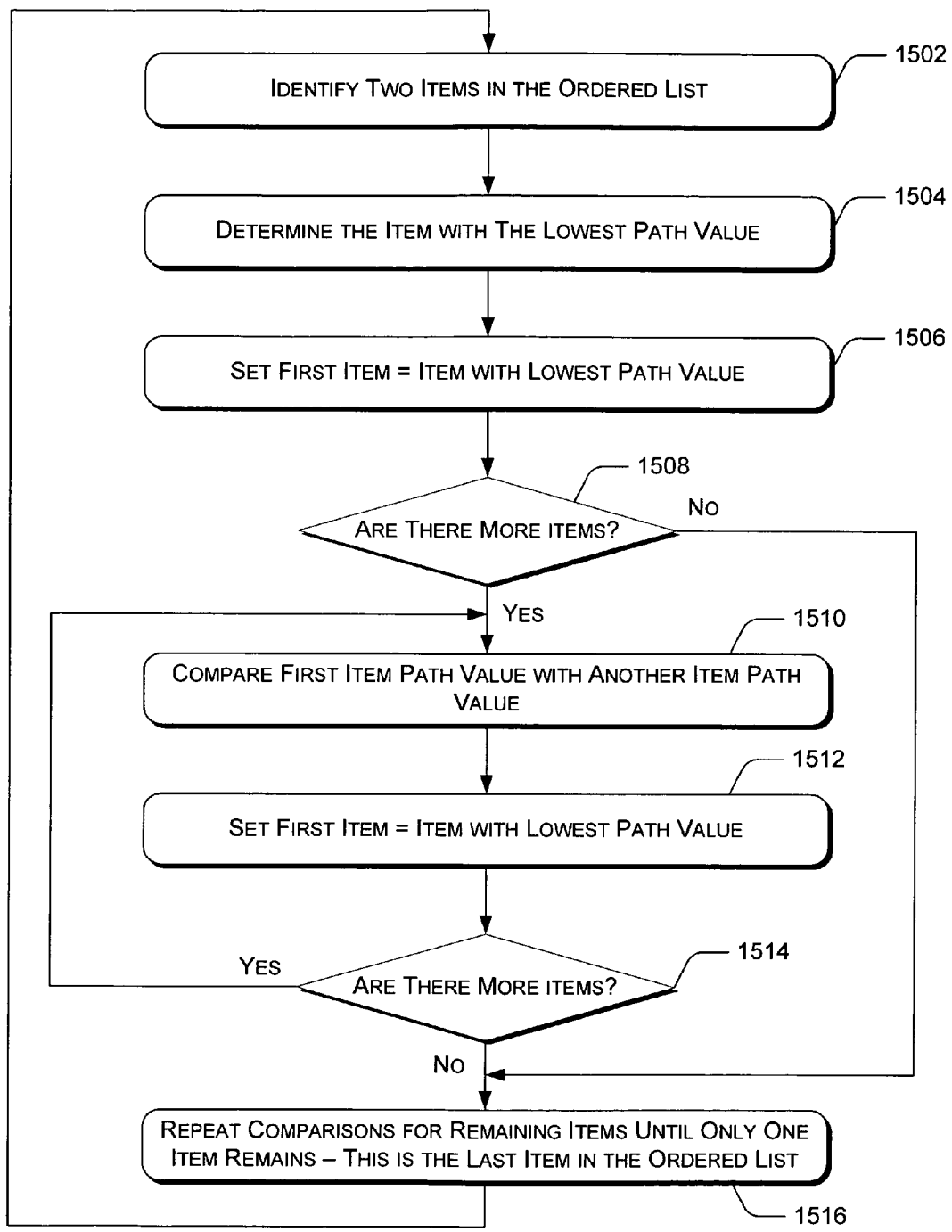
FIG. 15 is a flow diagram that illustrates an exemplary method for determining the order of items in an ordered list.

FIG. 15 is a flow diagram that illustrates an exemplary method 1500 for ordering items in a list based on path values associated with each of the items. The illustrated process can be implemented in any suitable hardware, software, firmware or combination thereof.

At block 1502, the system identifies two items in an ordered list. For example, referring to FIG. 11, application 1110 identifies two items that are associated with a particular list.

At block 1504, the system determines which of the two items has the lower path value. For example, application 1110 calls compare algorithm 1116, passing in the path values for the two items, and receives back the lower path value of the two. An exemplary method for determining which path value is lower is illustrated and described below with reference to FIG. 16.

At block 1506, the system assigns the first position in the ordered list to the item having the lower of the two path values.

At block 1508, the system determines whether there are additional items associated with the ordered list.

At block 1510, when it is determined that there are additional items associated with the ordered list (the "Yes" branch from block 1508), the system compares the path value for the item assigned to the first position in the ordered list with the path value associated with another item in the ordered list.

At block 1512, the system assigns the first position in the ordered list to the item having the lower of the two path values.

At block 1514, the system determines whether there are additional items associated with the ordered list.

If it is determined that there are additional items associated with the ordered list (the "Yes" branch from block 1514), then processing continues as described above with reference to block 1510.

When it is determined that the item currently assigned to the first position in the ordered list has been compared with each other item associated with the ordered list (the "No" branch from block 1508 or 1514), then at block 1516, the processing described above with reference to blocks 1502-1514 is repeated for the remaining items in the ordered list until only one item remains. The remaining item is assigned the last position in the ordered list.

Comparing Two Path Values

Figure 16:
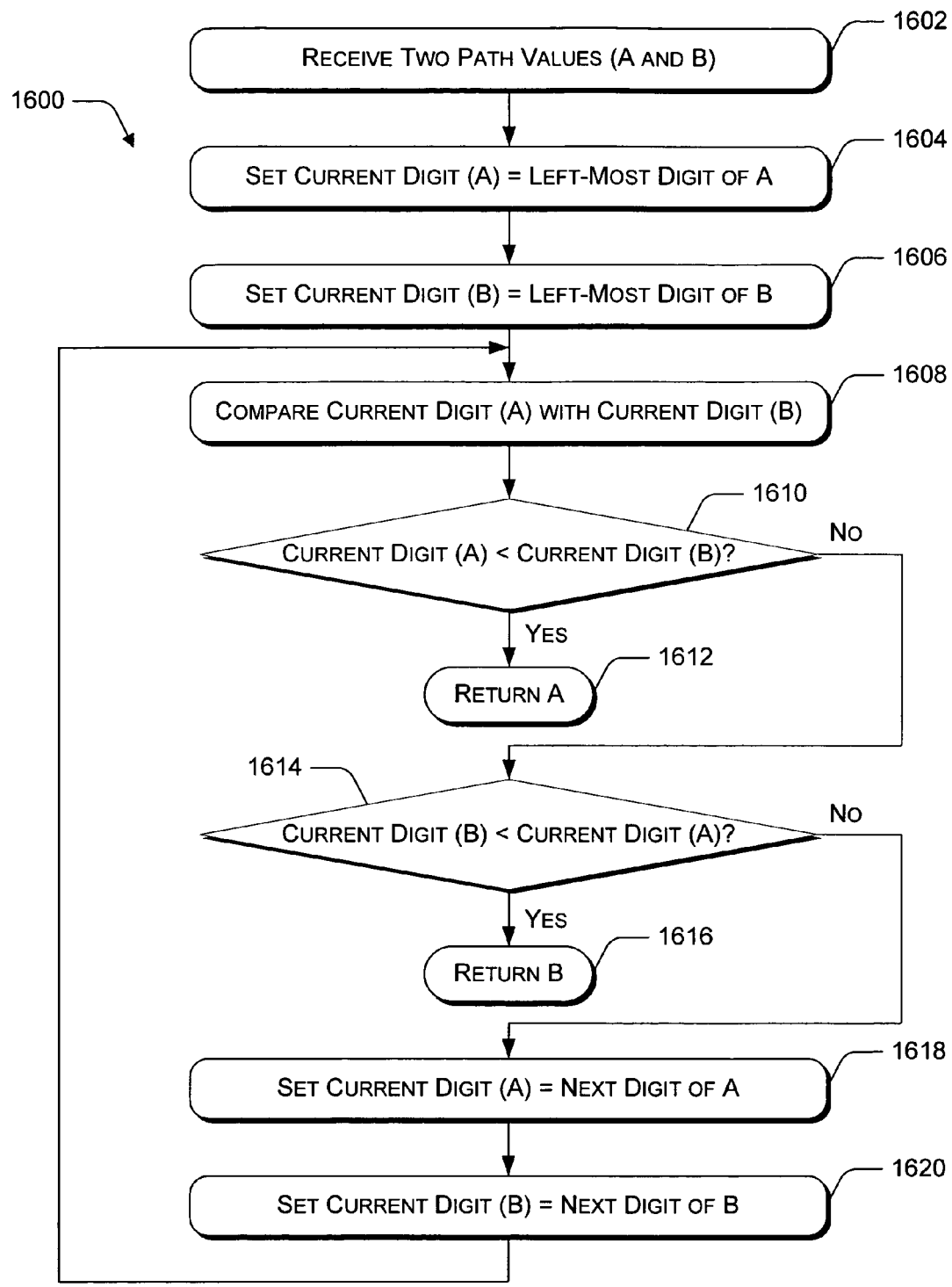
FIG. 16 is a flow diagram that illustrates an exemplary method for comparing two items to determine a relative order of the items within an ordered list.

FIG. 16 is a flow diagram that illustrates an exemplary method 1600 for comparing path values associated with two items in an ordered list. The illustrated process can be implemented in any suitable hardware, software, firmware or combination thereof.

At block 1602, an algorithm receives path values associated with two items in an ordered list. In an exemplary implementation, the path values are assigned to variables A and B, respectively. For example, referring to FIG. 11, compare algorithm 1116 is called from application 1110 with two path values.

At block 1604, compare algorithm 1116 sets a current digit (A) variable equal to the left-most digit of the first path value.

At block 1606, compare algorithm 1116 sets a current digit (B) variable equal to the left-most digit of the second path value.

At block 1608, compare algorithm 1116 compares the value of the current digit (A) variable with the value of the current digit (B) variable.

At block 1610, compare algorithm 1116 determines whether the value of current digit (A) is less than the value of current digit (B). For example, in the described exemplary implementation, the path values are binary. Accordingly, a particular digit may have a value of 1 or a value of 0. Furthermore, if one path value has more digits than another, then at some point, the current digit for the shorter path value may be equal to "null". In the described implementation, the order of path values is determined based on the rule: 0<null<1. Therefore, if the value of current digit (A) is equal to 0 and the value of current digit (B) is equal to null or 1, then current digit (A)<current digit (B).

If it is determined that the value of current digit (A) is less than the value of current digit (B) (the "Yes" branch from block 1610), then at block 1612 compare algorithm 1116 returns the value of variable A (the first path value).

On the other hand, if it is determined that the value of current digit (A) is not less than the value of current digit (B) (the "No" branch from block 1610), then at block 1614, compare algorithm 1116 determines whether the value of current digit (B) is less than the value of current digit (A).

If it is determined that the value of current digit (B) is less than the value of current digit (A) (the "Yes" branch from block 1614), then at block 1616 compare algorithm 1116 returns the value of variable B (the second path value).

On the other hand, if it is determined that the value of current digit (A) is equal to the value of current digit (B) (the "No" branch from block 1614), then at block 1618, compare algorithm 1116 sets the value of current digit (A) equal to the next digit of A (moving to the right).

At block 1620, compare algorithm 1116 sets the value of current digit (B) equal to the next digit of B (moving to the right).

Processing then continues as described above with reference to block 1608.

CONCLUSION

The techniques described above enable management of ordered lists that may be modified simultaneously by multiple users. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
identifying, by a computing device, an item to be placed at a particular position within a list, wherein the position of each item in the list is user-customizable;
associating, by the computing device, a path value with the item such that the path value represents the particular position within the list, relative to other positions within the list, wherein the associating includes:
  determining a first path value associated with an item in an immediately previous position in the list;
  determining a second path value associated with an item in an immediately next position in the list; and
  determining a third path value as the path value, the third path value being greater than the first path value and the third path value being less than the second path value, wherein the determining the third path value includes:
    determining a string of corresponding and matching digits from the left of the first and second path values;
    determining a string of corresponding but non-matching digits from the left of the first and second path values; and
    in an event that a first corresponding, but non-matching digit from the first path value is a null, appending to the string of corresponding and matching digits, a first corresponding, but non-matching digit from the second path value and a "0";
generating, by the computing device, a unique identifier; and
appending, by the computing device, the unique identifier to the path value associated with the item.

2. The method as recited in claim 1 wherein the path value is based on a binary tree structure.

3. The method as recited in claim 1 further comprising:
in an event that the first corresponding, but non-matching digit from the first path value is not a null, appending to the string of corresponding and matching digits, the first corresponding, but non-matching digit from the second path value and a "1".

4. The method as recited in claim 1 wherein the unique identifier comprises a globally unique identifier (GUID).

5. The method as recited in claim 4 wherein the GUID comprises a binary value.

6. The method as recited in claim 1 further comprising:
determining a seed value associated with the list; and
prepending the seed value to the path value associated with the item.

7. The method as recited in claim 6 wherein the seed value comprises a globally unique identifier (GUID).

8. The method as recited in claim 7 wherein the GUID comprises a binary value.

9. A system comprising:
a processor;
a memory;
an application stored in memory and executed on the processor, the application configured to:
  manage user-customizable positions of items in an ordered list of items by representing item positions within the ordered list based on each item's relative position to other items within the ordered list; and
  display the ordered list of items;
wherein the application comprises an insert algorithm configured to generate a path value that represents a relative position of a particular item within the ordered list, such that two items added simultaneously to the same position within the ordered list are assigned different path values, and wherein generating the path value includes:
  determining a first path value associated with an item in an immediately previous position in the list;
  determining a second path value associated with an item in an immediately next position in the list; and
  determining a third path value as the path value, the third path value being greater than the first path value and the third path value being less than the second path value, wherein the determining the third path value includes:
    determining a string of corresponding and matching digits from the left of the first and second path values;

determining a string of corresponding but non-matching digits from the left of the first and second path values; and in an event that a first corresponding, but non-matching digit from the first path value is a null, appending to the string of corresponding and matching digits, a first corresponding, but non-matching digit from the second path value and a "0".

10. The system as recited in claim 9 wherein the application comprises a peer-to-peer application.

11. The system as recited in claim 9 wherein the path value comprises:
a binary tree structure-based value; and
a globally unique identifier (GUID).

12. The system as recited in claim 11 wherein the path value further comprises a seed value associated with the ordered list.

13. The system as recited in claim 9 further comprising:
a compare algorithm configured to determine, based on path values associated with items, a relative order of two or more items within the ordered list.

14. One or more computer-readable storage media comprising computer-readable instructions recorded thereon, which, when executed, cause a computer system to:
associate a path value with an item in a list such that the path value represents the item's position in the list relative to positions of other items in the list, wherein the associating includes:
determining a first path value associated with an item in an immediately previous position in the list;
determining a second path value associated with an item in an immediately next position in the list; and
determining a third path value as the path value, the third path value being greater than the first path value and the third path value being less than the second path value, wherein the determining the third path value includes:
determining a string of corresponding and matching digits from the left of the first and second path values;
determining a string of corresponding but non-matching digits from the left of the first and second path values; and
in an event that a first corresponding, but non-matching digit from the first path value is a null, appending to the string of corresponding and matching digits, a first corresponding, but non-matching digit from the second path value and a "0";and
append a globally unique identifier (GUID) to the end of the path value to prevent associating identical path values with two items within the list.

15. The one or more computer-readable storage media as recited in claim 14 further comprising computer-readable instructions which, when executed, cause the computer system to prepend to the path value a seed value that is associated with the list, such that items associated with the list will appear clustered if the list is merged with another list.

* * * * *